Oct. 22, 1935.    D. J. MARTIN    2,018,458
BRAKE
Filed May 19, 1934
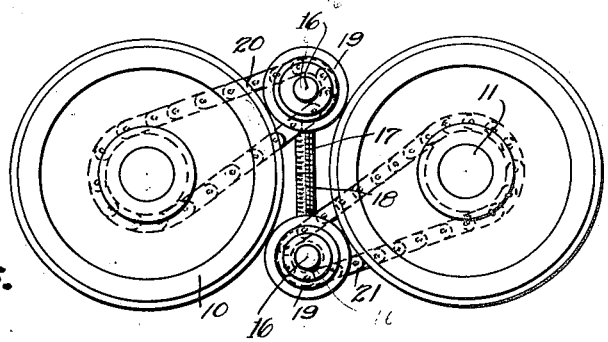
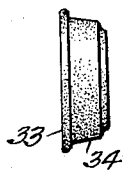
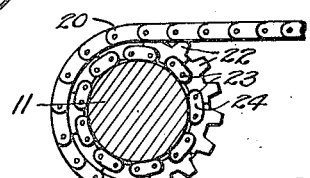
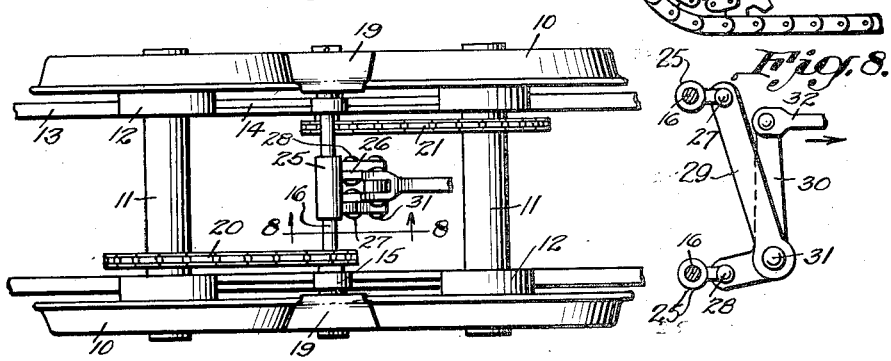
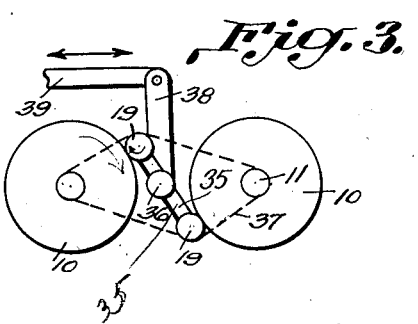
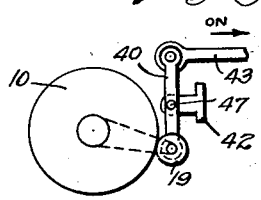
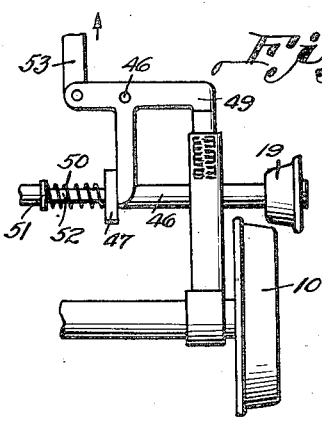
Inventor
Douglas J. Martin
By Miller & Miller
Attorneys Patented Oct. 22, 1935

2,018,458

UNITED STATES PATENT OFFICE 2,018,458

BRAKE

Douglas J. Martin, New York, N. Y.

Application May 19, 1934, Serial No. 726,561

9 Claims. (Cl. 188—80)

This invention relates to a friction brake and has for an object to provide an improved construction for stopping the rotation of a wheel or wheels and especially of the wheels of a train or locomotive by applying a tangential frictional boss at the periphery of the wheel or wheels whose rotation is being stopped, the tangential force being applied by means of another wheel coming into contact with the periphery thereof, but having its periphery at the contact point rotating in an opposite direction to the periphery of the wheel to be stopped to thereby diminish or eliminate any additional pressure or force on the bearing of the wheel whose rotation is being stopped.

A further object of this invention is to apply a tangential force stopping the rotation of the wheel, the force being proportional to the rotation of the wheel so that as the wheel slows down and comes to a stop the force will lessen and cease as the wheel is stopped.

A further object of this invention is to provide a braking wheel whose periphery may be moved into contact with the periphery of the wheel to be stopped to thereby apply a tangential frictional force, the movement of the brake wheel preferably resulting from the movement of the wheel itself by linking the brake wheel shaft to the wheel axle.

Still a further object of this invention is to provide means for restoring the proper and true taper on the wheels of the locomotive or train without the usual necessity of removing the wheels therefrom by temporarily substituting an abrasive wheel for the brake wheel of this invention.

With the foregoing and other objects in view, as will hereinafter become apparent, this invention comprises the constructions, combinations and arrangements of parts hereinafter set forth, disclosed and shown on the accompanying drawing. In this drawing, Figure 1 is a side elevation of the car truck wheels shown diagrammatically embodying the invention, Figure 2 is a plan view of the same, Figures 3 and 4 are diagrammatic views of modified forms of braking means, Figure 5 is a side elevation of another modified form of brake, Figure 6 is a side elevation of an abrasive wheel, Figure 7 is a side elevation of the link sprocket wheel and chain, and Figure 8 is a side elevation of the control means of Figures 1 and 2.

There is shown at 10 the car or locomotive wheels mounted on the usual axles 11, the axles 11 being mounted for vertical movement in their bearings 12 on the car or locomotive frame 13. Supported between the axle bearings 12 are the brake carrying frames 14 on which are supported bearings 15 for the brake shaft 16, there being one pair of bearings 15 for the upper brake shaft 10 on top of frame 14, and another pair of bearings attached to the bottom of the frame 14 for the lower brake shaft.

The bearings 15 are mounted on the frame 14 in a manner similar to the conventional mounting of the bearings 12 on the car or locomotive frame 13 so that the shaft 16 may move toward or recede from each other, a compression spring 17 within a housing 18 being located between the shaft 16 to normally hold them away from car wheels. Brake wheels 19 pinned or keyed to each end of the shaft 16 partake of any rotation of the shaft 16, the shaft 16 being caused to rotate by means of sprocket chains 20 and 21, the chain 20 going to the upper shaft 16 and the chain 21 to the lower shaft 16. Sprocket gears 22 are fixed to the axles 11 and shaft 16 in the manner shown in Figures 1 and 7. These sprocket gears 22 are sweated on to the shaft 16 and axles 11 by removing one of the pins 23 from one of the connecting links 24 heating the chain to cause it to expand, placing it around the shaft or axle, driving in the pin again so that when the links contract the sprocket gear is held securely on the shaft or axle, thus eliminating the necessity of disassembling the car wheels or brake wheels from the axles or shaft in order to place the sprocket chain in position.

Each brake shaft 16 extends through a central control bearing 25, the bearings 25 each being provided with apertured bosses 26 which are pivotally connected by bolts 27 and 28 to control levers 29 and 30, the control levers 29 and 30 being pivoted together as at 31. An operating lever 32 is pivoted to the lever 30.

In operation the operating lever 32 is moved in the direction of the arrow by any suitable control or connecting rods located in the cab of the locomotive causing the pivot points 27 and 28 to be drawn closer together, thereby causing the central bearings 25 to approach each other and carry the brake shaft 16 toward each other compressing the spring 17 and bringing the brake wheels 19 into contact with the car wheels 10.

As will be observed, the periphery of the brake wheels 19 will then come into contact with the periphery of the car wheels 10, the periphery of the brake wheels 19 having a complementary taper to the periphery of the car wheels 10. Due to the chains 20 and 21, the brake wheels 19 will each be continuously rotated, so that when the periphery of the brake wheels 19 come into contact with the periphery of the car wheels 10, they will each be rotated in opposite directions so that the brake wheels will apply a tangential force tending to slow the rotation of the car wheels 10 and thus giving an effective braking course and slowing the rotation of the car wheels 10 without however applying any increased pressure to the car wheel bearings 12, thus preventing the car wheel bearings 12 from wearing out at an increased rate due to operation of a brake.

With the present system the quickest way of stopping a train or locomotive is to cause the wheels to rotate in a reverse direction whereby the tangential force of the tracks will be in a direction opposite to the rotation of the wheels. The brake wheels 19 apply this same tangential force against the rotation of the wheels 10 and help the train to stop quite rapidly.

An additional feature of this invention is the provision of an abrasive wheel 33 shown in Figure 6. This abrasive wheel 33 may be substituted for the brake wheels 19 and the abrasive wheel 33 has the proper taper on its periphery 34 so that when temporarily substituted for the brake wheels 19 the abrasive wheel 33 may be operated against the car wheels 10 to restore the proper taper thereto, thereby eliminating flat spots on the car wheels and eliminating the necessity for removing the car wheels from the car or locomotive in order to true up the taper thereon.

A different form of this invention is shown in Figure 3 wherein the brake may be applied in either direction, irrespective of which way the train is travelling. In this case the shafts of the brake wheels 19 are mounted on a frame 35 which is pivoted at its center 36. A single chain 37 is connected about the axles 11 of the car wheels 10 and over the shaft of the brake wheels 19. A control lever 38 may shift the frame 35 about its center in either direction as the operating rod 39 is moved back or forward as shown by the arrow depending on which direction the car is travelling. When travelling in one direction the upper brake wheels 19 will apply to one set of car wheels 10 and the lower wheels 19 to the other set of car wheels 10, and when the train is travelling in opposite directions then the brake wheels 19 will be rotated about the center 36 to apply to the opposite direction of car wheels.

A very much simplified form of the invention is shown in Figure 4, wherein one set of brake wheels 19 is brought against the car wheels 10, being mounted on a frame 40 and pivoted at 41 to a support 42, the operating lever 43 applying the brake when moved in the direction of the arrow to pivot the frame 40 on its support 42.

In Figure 5 the brake wheel 19 is moved in a transverse direction to come into contact with the car wheels 10. The brake wheel 19 in this case is mounted on a sleeve 46, which is splined on a shaft 52 operated either in the same manner as the forms already described, or by a separate independent motor. A compression spring 50 between a collar 47 on sleeve 46 and a stop 51 on shaft 52 tends to urge the sleeve 46 and brake wheel 19 transversely away from the car wheel 10, the taper of the car wheel and brake wheel allowing the wheels to separate on transverse movement. A bell crank lever 49 pivoted as at 46 may be operated by an operating lever 53 in the direction of the arrow to apply the brake, the spring 50 serving to return the brake to non-operative position when the operating lever 53 is released.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

1. Means for applying a tangential frictional force to the periphery of a rotating wheel comprising a braking wheel, means for continuously rotating the periphery of the braking wheel in the same axial direction as the wheel and in direct proportion to the rotating speed thereof, means for moving said already continuously rotating braking wheel into tangential contact with the wheel, whereby the contacting point of the wheel and of the braking wheel will be moving in opposite directions, and means normally urging said braking wheel out of contact with the wheel.

2. Means for applying a tangential frictional force to the periphery of a rotating wheel comprising a braking wheel, means for continuously rotating the periphery of the braking wheel in the same axial direction as the wheel and in direct proportion to the rotating speed thereof, means for moving said already continuously rotating braking wheel into tangential contact with the wheel, whereby the contacting point of the wheel and of the braking wheel will be moving in opposite directions, and means normally urging said braking wheel out of contact with the wheel, said means for rotating said braking wheel being operated by the rotation of the wheel to be braked.

3. Means for applying a tangential frictional force to the periphery of a wheel comprising a braking wheel, means for simultaneously and continuously rotating the periphery of the braking wheel in the same axial direction as the wheel, means for moving said already continuously rotating braking wheel into tangential contact with the wheel, whereby the contacting point of the wheel and of the braking wheel will be moving in opposite directions, means normally urging said braking wheel out of contact with the wheel, said means for rotating said braking wheel being operated by the rotation of the wheel to be braked, said brake wheel rotating means comprising a brake wheel shaft, a link sprocket on the brake wheel shaft, and a sprocket chain rotated by the rotation of the wheel to be braked.

4. Means for applying a tangential frictional force to the periphery of a wheel comprising a braking wheel, means for simultaneously and continuously rotating the periphery of the braking wheel in the same axial direction as the wheel, means for moving said already continuously rotating braking wheel into tangential contact with the wheel, whereby the contacting point of the wheel and of the braking wheel will be moving in opposite directions, means normally urging said braking wheel out of contact with the wheel, said means for rotating said braking wheel being operated by the rotation of the wheel to be braked, said brake wheel rotating means comprising a brake wheel shaft, a link sprocket on the brake wheel shaft, a sprocket chain rotated by the rotation of the wheel to be braked, and an operative rod under the control of an operator for operating said means to move the braking wheel into contact with the wheel to be braked.

5. A braking system for car wheels rotatable with car wheel axles in a car, comprising a pair of rotatable brake shafts, means directly connecting said brake shafts to the car wheel axles for continuous rotation therewith, braking wheels mounted on the end of said rotatable brake shaft, said braking wheels being mounted in the same plane as said car wheels, and means moving said brake shaft in the direction of said car axle whereby said rotating braking wheel will come into peripheral tangential contact with said car wheel.

6. A braking system for car wheels rotatable with car wheel axles in a car, comprising a pair of rotatable brake shafts, means directly connecting said brake shafts to the car wheel axles for continuous rotation therewith, braking wheels mounted on the end of said rotatable brake shaft, said braking wheels being mounted in the same plane as said car wheels, means moving said rotating brake shaft in the direction of said car axle whereby said braking wheel will come into peripheral tangential contact with said car wheel, and means normally urging said brake shaft in an opposite direction.

7. A braking system for trains comprising in combination with the car trucks having a plurality of pairs of car wheels fixedly mounted on rotatable axles, a brake shaft for each car wheel axle, means for mounting said brake shafts for movement toward and from their respective car wheel axles, means for continuously rotating said brake shafts directly operated by the rotation of said car wheel axles, a brake wheel mounted on each end of said brake shafts in the same plane with the car wheels, whereby the brake wheels will partake of the same axial rotation as said car wheels, and may be moved into tangential contact with said car wheels.

8. A braking system for trains comprising in combination with the car trucks having a plurality of pairs of car wheels fixedly mounted on rotatable axles, a brake shaft for each car wheel axle, means for mounting said brake shafts for movement toward and from the car wheel axles, means for continuously rotating said brake shafts directly operated by the rotation of said car wheel axles, a brake wheel mounted on each end of each of said brake shafts in the same plane with the car wheels, whereby the brake wheels will partake of the same axial rotation as said car wheels, and may be moved into tangential contact with said car wheels, and means under the control of an operator simultaneously moving said brake shafts toward their respective car wheel axles.

9. In the braking system as set forth in claim 5, wherein said braking wheels are each removably mounted on said brake shafts for replacement by an abrasive wheel for grinding the periphery of the car wheels and trueing the taper thereof.

DOUGLAS J. MARTIN.